Nov. 4, 1958 J. LYMAN 2,858,875
METHOD AND APPARATUS FOR PRODUCING STRUCTURAL
ELEMENTS OF GLASS FIBER REINFORCED PLASTICS
Filed July 6, 1955 2 Sheets-Sheet 2
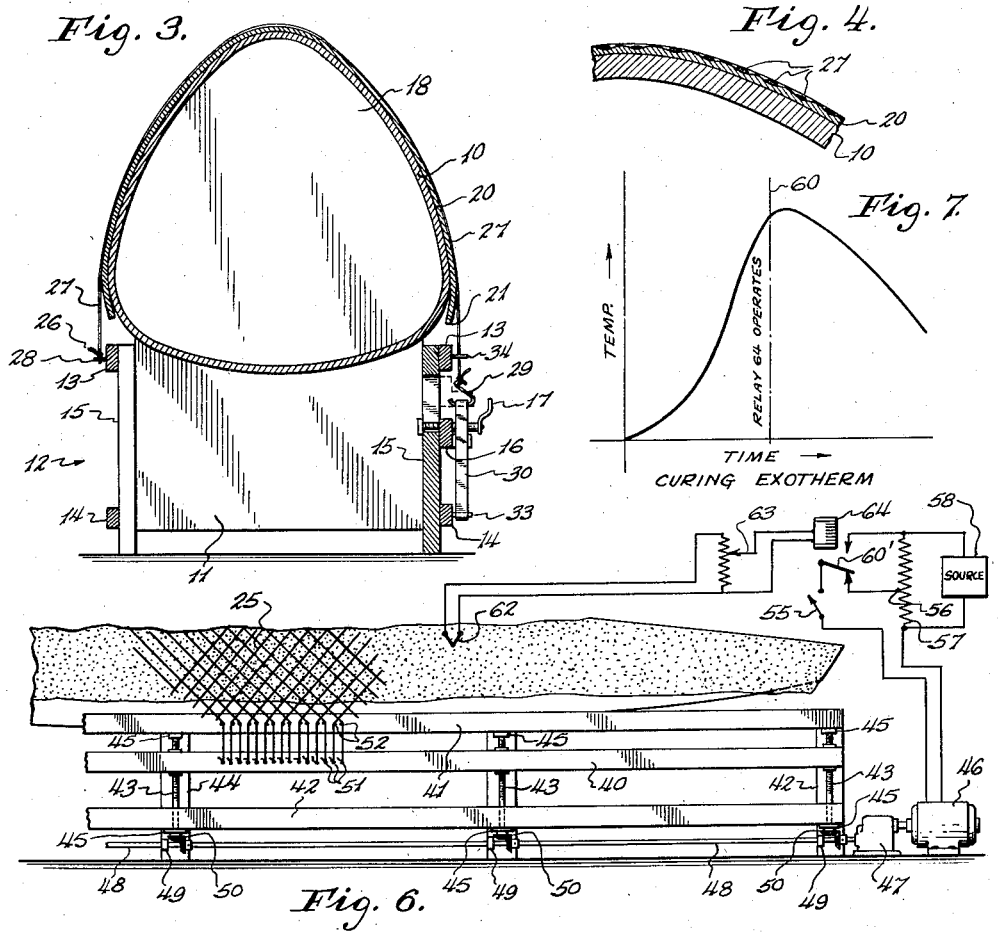
INVENTOR

United States Patent Office 2,858,875
Patented Nov. 4, 1958

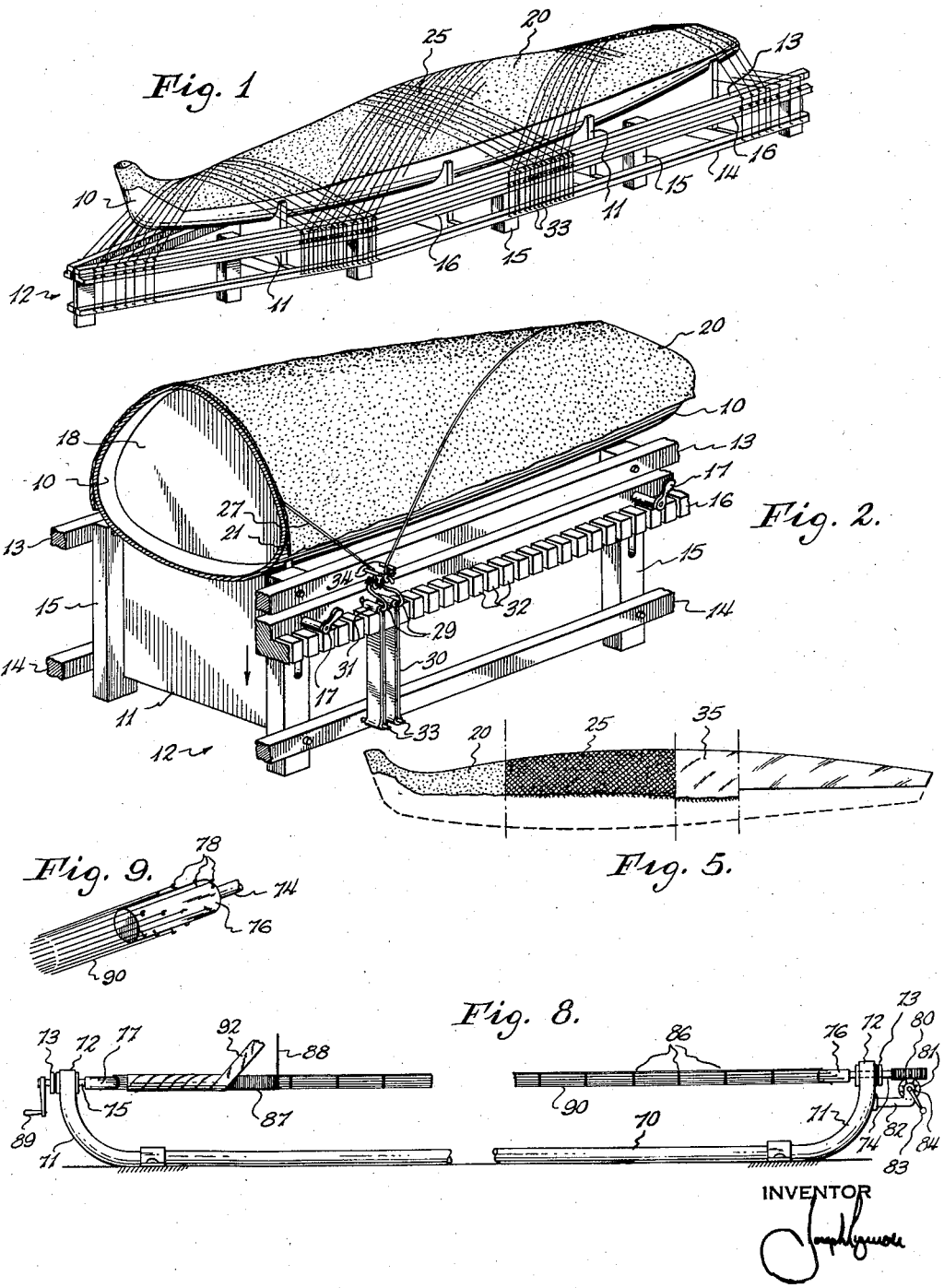

2,858,875

METHOD AND APPARATUS FOR PRODUCING STRUCTURAL ELEMENTS OF GLASS FIBER REINFORCED PLASTICS

Joseph Lyman, Huntington, N. Y., assignor to Aero-Nautical Boat Shop, Inc., Halesite, N. Y., a corporation of New York Application July 6, 1955, Serial No. 520,208

4 Claims. (Cl. 154—1.7)

My invention relates to an improved method of and apparatus for producing glass-reinforced plastic articles and structures, and more particularly for producing very thin substantially rigid glass fiber reinforced plastic articles having a strength to weight ratio, so far as I am aware, far greater than has been heretofor attained. Furthermore, my process or method may be incorporated in a great many of the presently known methods of producing or manufacturing glass fiber reinforced plastic articles, such incorporation rendering the resulting structures much stronger than they would otherwise be. Also, glass fiber reinforced articles and structures manufactured in accordance with my process may be employed where extremely high strength to weight ratios are desirable or are a requirement.

Although in my process or method, generally known standards regarding types of glass fiber reinforcements, types of resins, and glass-to-resin bulk ratios are employed, I have greatly increased the strength to weight ratios by a novel method of handling or manipulating the glass reinforcements. The method and apparatus of my invention is applicable for use with most of the known plastics or resins, and is especially applicable in connection with resins of the thermosetting types, such as, for example, the polyesters, epoxies, phenolics, melamines, silicones, etc.

The principal object of my invention resides in the method of producing or forming substantially rigid structures of glass-reinforced plastics wherein fibrous glass, formed into continuous strands, known in the art as "rovings," are preformed, as by means of a mold, into the desired shape of the completed structure, the rovings impregnated with a suitable resin, and the rovings then immediately stretched to a predetermined tension, or subjected to a predetermined tensional load, and maintained under such load during the curing of the resin.

Another object of the present invention resides in the improved method of producing glass reinforced plastic articles or structures in which a plurality of glass fiber rovings are preformed into the desired shape of the completed structure, the rovings being either pre-impregnated prior to such forming or impregnated thereafter with a thermosetting resin, then immediately applying a predetermined load to each of the rovings and maintaining said loading thereon until the resin is cured.

A further object of the present invention resides in the method of the character set forth above wherein a first predetermined load is applied to each of the impregnated, uncured, resin-saturated rovings during a portion of the curing cycle of the resin, and then applying a second predetermined load, increasing said first load to a second predetermined load in accordance with a curing characteristic of the resin, such as at a predetermined temperature thereof.

Another principal object of the present invention is to provide apparatus for carrying out the above described process or method.

Another object resides in the provision of means for preforming a plurality of glass rovings of continuous glass strands into the desired shape of the completed structure, the rovings being impregnated with a suitable resin, and means for uniformly stretching each one of said rovings or strands to, and maintaining thereon, a predetermined tension close to the elastic limit thereof whereby said rovings are maintained under this high tension during the curing of the resin.

Still another object of the present invention is to provide apparatus of the above character wherein the preforming means for the rovings comprises a mold over which the strands or rovings are passed and wherein the fastening means includes elastic means coupled therewith for uniformly applying said tensional load to each of said strands or rovings.

A further object of the present invention includes the provision of apparatus of the above character wherein means are provided for applying to said rovings a second predetermined tensional load greater than said first tensional load.

Other objects and advantages of the method and apparatus of the present invention not at this time more particularly enumerated will become clearly apparent as the description of a preferred embodiment thereof proceeds, reference being made to the accompanying drawings wherein:

Fig. 1 is a perspective view of an embodiment of the apparatus for producing glass fiber reinforced plastic articles or structures in accordance with my novel method, the exemplary apparatus illustrated being adapted for the production of a boat hull;

Fig. 2 is a detail partly broken away of the apparatus of Fig. 1 showing particularly the fastening means for the glass fiber rovings;

Fig. 3 is an end view of the broken away portion of the apparatus of Fig. 2;

Fig. 4 is a partial cross-sectional view of the mold, mat, roving, resin combination;

Fig. 5 is a view partially in phantom of the boat hull at various stages in its production and will be used as an aid in the description of the novel method of my invention;

Fig. 6 is a view partially broken away, of a modification of the apparatus of my invention;

Fig. 7 is a typical exotherm of a typical thermosetting resin, such as, a polyester resin; and Figs. 8 and 9 are views illustrating another embodiment of my invention.

Although the method of the present invention has been illustrated as being applied to the production of a boat hull fashioned in glass fiber reinforced plastics, it is to be understood that the same method, in its broader aspects, may be employed in the production of glass fiber reinforced plastic articles or structures having many configurations such as, for example, structural, relatively thin, sheets or plates which may be employed in the construction of larger structures such as building walls and partitions, and in the complete production of entire aircraft wings or fuselages, in the production of truck bodies and the like where extremely high strength-to-weight ratios are a necessity; it may be used in the production of rods and tubes for use as boat masts, booms, spreaders and the like, and in the production of many more relatively complexly shaped articles and structures.

I have already mentioned that my novel method may be carried out with most of the available resins, and is particularly applicable in the production of articles wherein a thermosetting resin is employed such as, for example, a polyester resin. Articles and structures made in accordance with the teachings of the present invention may be used in a great many applications and of course, depending upon the application, various ratios of glass to resin may be required, these ratios being determined generally by the particular application. However, these ratios are known and may be employed in the present invention. Furthermore, in carrying out the method of the present invention the curing process can be any of the various known types, such as, curing at room temperatures or oven curing. Also, known accelerators may be employed in various amounts depending upon the desired curing time and the particular application. Where large articles are being constructed it may be desirable to have a longer curing time in order properly to carry out the process of the present invention.

Although the process of the present invention may be employed in the production of glass fiber reinforced plastic articles or structures of a great many shapes and sizes, the process will be described herein in the production of a relatively large structure, i. e., a boat hull, although it will be understood that the same process may be employed in constructing, for example, aircraft fuselages. To further illustrate that other and entirely differently shaped articles or structures may be made using the process of the present invention I have also described the application of this novel process in the production of a boat mast, it being understood that similar objects may be fabricated, such as spreaders, booms, and the like, where strength and light weight are requisites.

Referring now to Figs. 1, 2 and 3, there is illustrated an example of one form of apparatus for carrying out the above-outlined method wherein a mold 10 is provided having a contour conforming to the desired shape of the completed boat hull. The mold 10 is supported in suitable mold-receiving cradles 11 which may form a part of a jig 12. The jig 12 comprises a frame made up of upper and lower rails 13 and 14 respectively, which in turn are supported on suitable uprights or legs 15. As shown clearly in Fig. 1, the jig 12 conforms generally to a horizontal, longitudinal cross-section of the hull at its widest dimension. Furthermore, it will be noted, especially in Fig. 3, that the width of the jig 12, that is, the distance between the rails 13 and 14, is substantially narrower than the width of the hull mold 10 so that when the glass fiber rovings are applied, as will be described, they will pass over the mold surface and become substantially tangent to the mold surface at the maximum width of the mold along substantially its entire length. Preferably adjustably secured to the uprights or legs 15 is a movable frame or rail 16 which may be rendered fixed to the legs 15 and hence relative to the jig and mold as by a suitable clamp 17, the function of which will become apparent as the description proceeds. It should be noted that although I have shown an adjustable rail 16 on only one side of the jig, it will be understood that another substantially identical rail may be adjustably secured to the opposite side thereof. The entire jig may be constructed of wood or metal but must be of sufficient strength to withstand the rather large forces to which it will be subjected during the fabrication of the hull shell on the mold 10.

The hull mold may also be formed of any suitable material and may be a solid plastic form, or may be a hollow, plastic, metal, or wooden form which is provided with suitable reinforcing bulkheads, one of which is illustrated at 18. On the other hand, the mold may comprise a plurality of spaced bulkheads having the desired shape to which strips of wood are fastened longitudinally therebetween, one next to the other. After the strips are all in place the resulting mold surface is thoroughly smoothed. Again, the mold must be rigid and strong enough to withstand the pressures applied thereto during the fabrication of the hull. It is important that the surface of the mold be perfectly smooth and free from rough spots or crevices in order to avoid mold release problems, and accordingly, it is preferably covered with a suitable resin, such as a polyester resin, and allowed to cure. Any of a number of conventional mold-release compounds may be used.

The mold is now ready for the fabrication of one half of the hull shell and is placed in the cradles 11 of the jig 12 where it will remain stationary due to its own weight. It may, however, be secured to the cradles if desired so as to insure that there will be no relative movement between the mold and the jig.

Over the top surface of the mold I place or lay a mat 20 of chopped glass fibers, as an example, a two ounce mat, which is then cut or trimmed so that its edges extend slightly beyond the maximum width of the mold as shown at 21 in Figs. 2 and 3. A woven fabric may also be used, depending upon the character of the finished structure. After the mat is in place on the mold I form thereover a basket-like weave of glass fiber rovings as generally indicated at 25 in Figs. 1 and 5. In the example being described I use a 60-end roving, that is, a roving having 60 strands. In Fig. 1 all of the rovings are not shown, it being understood, of course, that the entire surface of the mold is covered with this basket-like or criss-crossed weave. At this point I should like to make it clear that by the term "basket-like weave" I do not necessarily mean that the rovings are intertwined, as in a woven fabric, but may be laminal, that is, one layer of rovings may be placed or formed on the mold in one direction and then another layer may be placed or formed thereover in the opposite direction.

The rovings may be applied to the mold as follows. One end 26 of the roving 27 is secured or tightly tied to one side of the jig or frame 12, as on a pin 28 on the top rail 13 in Fig. 3, and the roving is passed over the mold and mat from that side to the other and is tied or otherwise secured or fastened to a fastening means such as a hook 29 which is located at a preferably considerable distance, longitudinally, from the pin 28 on which it is fastened on the other side such that the roving is slanted relative to the longitudinal axis of the mold. This is clearly illustrated in Figs. 1, 2 and 3. As illustrated most clearly in Fig. 2, the fastening means or hook 29 is in the general form of an S, the lower portion of which is flattened so that the end of an elastic member or means such as a large elastic band 30 may be slid over the same as at 31.

The movably adjustable rail 16 is set in its uppermost position (as in Fig. 2) and the rovings are tied to the hooks 29 and the rail 16 is maintained in this uppermost position by tightening the clamp 17. Further, the rail 16 is provided with a plurality of slots 32. The dimension of the slots, in the illustrative example, is substantially the same as the double thickness of the elastic bands 30 such that, when the band ends are placed over the ends of hooks 29 they will not be able to slip through the slots when placed under tension, as described below. On the lower rail 14 are provided a plurality of fixed pins 33 which are positioned directly under each of the slots 32 in rail 16. Prior to fastening the ends of the rovings 27 to the hooks 29, the hooks are placed in the ends of elastic bands 30, the bands inserted into the slots 32 with the hook against the top surface of rail 16 and the other ends of the bands are then stretched downwardly and placed on the pins 33. The distance between the lower rail 14 and the slots in the upper rail 16 is such that, upon release of the upper rail 16 brought about by loosening the clamps 17, the elastic bands 30 will apply a predetermined tension to the rovings 27. This predetermined tension is determined by the character of the completed structure, that is, it is dependent upon the type and size of rovings employed. With 60-end rovings, the predetermined tension may lie within a range of between 10 and 45 pounds or near the elastic limit of the glass rovings. Directly over each of the slots 32 in rail 16 are a plurality of fixed pins 34 in upper rail 13 which serve as guide pins for the rovings 27 so that when tension is applied to them they will not move appreciably from the position they had when tied to hooks 29.

It will be noted that all of the rovings are placed on the mold in this manner and are arranged to form, over the surface of the mold with its mat covering, a basket-like weave, the squares or diamonds thus defined by the rovings having an area of approximately one to two square inches. Furthermore, it will be understood that instead of having one end of each roving fixedly tied to one side of the jig and applying tension to the other end thereof, tension may be applied to both ends by providing an additional moving rail and pins on both sides of the jig. Also, instead of using hooks 29 the roving ends may be tied directly to the elastic bands. In addition, it is within the scope of the present invention to apply tension to the rovings by employing other elastic means such as coil springs having the desired elastic constant, instead of the elastic bands.

After all of the rovings have been placed over the matted mold in the manner described above and before the movable rail 16 is lowered, i. e., the rovings are not as yet tensioned, I cover the entire surface with a suitable thermosetting resin, such as a polyester thermosetting resin as at 35 in Fig. 5. To the resin may be added suitable accelerators and the like as is known to those skilled in this art, the amount of accelerator added being dependent upon the desired curing time. The amount of resin applied is determined by the desired glass-to-resin ratio of the completed hull half, this ratio being substantially 70% to 30%, respectively, in the illustrative embodiment. After the resin has been applied it is worked into the surface so that both the glass fiber mat and the unstretched rovings are thoroughly and completely saturated or impregnated. This may be accomplished with rollers which are moved under pressure back and forth over the surfaces of the mat and rovings.

It should be pointed out that this thorough impregnation of the glass fiber with resin may be accomplished by a number of techniques such as, for example, a female mold fitted over the surface of the mold 10 to which pressure is applied, or by the vacuum bag method. An advantage of using one of the latter devices is that a smooth finished surface will result.

After the mat and rovings have been completely impregnated as described above, the clamps 17 are released whereupon the elastic members or elastic bands 30 apply a predetermined tension, say 20 to 40 pounds, to each of the rovings of the weave 25 and this tension is maintained during the curing cycle of the resin. It will be understood that instead of providing a movable rail, such as rail 16, and tensioning all of the rovings simultaneously as above described, the rail 16 may be fixed and each band may be slipped out of its respective slot so that the band may apply the desired tension.

The advantages of this feature of the process and apparatus of my invention, i. e., the stretching of the fiber rovings during the curing process, serves very important functions in the characteristics of the final structure. In the first place, the resulting structure is relatively thin, in the example described on the order of .070 to .080 inch, and is therefore very light in weight, yet the strength is extremely high. The light weight results from the amount of glass and resin which is employed, but the strength results from the reinforcing effect of the criss-crossed rovings, which, due to the stretching of the rovings, partially imbed themselves into the surface of the mat as shown in Fig. 4 and when cured act as reinforcing rods or bars. Also the web of glass rovings, under tension, compresses the mat firmly against the mold and thereby forces the mat to conform to every contour thereof. The stretching of each roving serves two additional important functions. In the first place, the modulus of elasticity is greatly increased since any applied loads fall on the glass fibers which have a high tensile strength before they fall on the resin which has a relatively low tensile strength. In the second place, stretching of the rovings provides a greatly increased uniformity of tension between the individual fibers or filaments of each roving thereby allowing each fiber of the roving to share its portion of applied loads.

After the resin is cured the rough edge of the hull half may be suitably trimmed as at 36 in Fig. 5 thereby completing one half of the hull shell. The other, or lower, half of the hull shell is produced in exactly the same manner, the mold being turned over and placed in suitably contoured cradles replacing cradles 11. A separate jig, substantially identical to the jig 12, may be provided for constructing the bottom half of the hull to speed construction.

Depending upon the character and use of the completed structure, for example, one requiring a thicker shell section or a greater glass content, another mat may be applied over the basket-like weave of rovings either before or after impregnation of resin. Furthermore, a second basket-like weave of rovings may be applied. In any case, the rovings are stretched after impregnation and are maintained in a stretched condition during the curing process of the resin.

In Fig. 6 I have illustrated a further embodiment of apparatus for carrying out the method or process of my invention. In this embodiment I have eliminated the requirement of elastic means for applying a predetermined tension to the rovings which are formed in a basket-like weave 25 over the mat 20 on the mold 10. Furthermore, in this embodiment, after the rovings are in place, the tension is applied to the rovings through completely automatic means. In Fig. 6, the mold is identical to that of Fig. 1 and the jig is likewise substantially identical except that in Fig. 6 the movable rail 40, instead of being movably secured to legs 15 of the jig by clamping devices which are released after impregnation of the glass fiber mat and rovings, is mounted between upper and lower rails 41 and 42 on lead screws 43 which are suitably journaled in bearings therein as at 45. Rotation of lead screws 43 is imparted by a motor 46 which drives, through a preferably high ratio reduction gearing 47, a long drive shaft 48 journaled in suitable bearings 49 underneath lower rail 42. Bevel gearing 50 transmits the shaft motion to the lead screws 43 resulting in a vertical movement of the entire movable rail 40. Preferably evenly spaced along the entire length of the movable rail 40 which constitutes a part of the fastening means for the rovings 27, are a plurality of hooks 51 to which are tied the plurality of glass rovings 27, after being passed over aligning pins 52 as in Fig. 2. As in Fig. 2 each of the ends of the roving may be secured or fastened to a movable rail in each side of the mold depending upon the dimensional complexity of the article being made.

In the modification of Fig. 6, after the rovings are in place and are drawn snugly, but not tightly, over the surface of the mold with its mat undercovering, the entire upper half of the mold is covered with a measured amount of thermosetting resin, the measured amount thereof being such as to provide the desired glass-to-resin ratio, as before. While the resin is still plastic or uncured, the automatic means for tensioning the rovings is started by closing control switch 55, energizing motor means 46 through source 58 and slowly rotating shaft 48 through gear reduction means 47. Rotation of shaft 48 driving through bevel gearing 50 imparts rotation to vertical lead screws 43 which, in turn, move the movable rail 40 downwardly thereby imparting tension to each of rovings 27. The motor 46 may be of the induction type which when energized with a predetermined voltage continues to run until a particular load is reached at which time it will stall but still holding the load. Thus when switch 55 is closed the motor continues to operate to apply tension to each of the rovings 27 until a predetermined tension thereof is achieved. This predetermined tension is determined by the magnitude of the voltage supplied thereto, as determined by the tap 56 on resistor 57, the relay arm 60' being in its down position, the motor stalling when the predetermined tension is achieved. The resin is then cured or partially cured with the rovings maintained under tension.

I have found that both the modulus of elasticity and the strength-to-weight ratio of the finished structure is greatly increased by applying an additional tension to the glass rovings at a particular point during the curing process, i. e., when the resin is partially cured and has reached a semi-solid state but has not yet become infusible. Most thermosetting plastic resins exhibit marked curing characteristics. For example, many undergo a marked temperature change during the curing process. The exotherm 59 of the curing process of a typical resin, such as a polyester resin, is illustrated in Fig. 7. As shown, the temperature rises rather sharply and at a point near the curve peak, as illustrated by the dot-dash line 60 of Fig. 7, the resin becomes semi-solid but not completely infusible and at this point I apply an additional predetermined tension to rovings 27, for example, as near the elastic limit of the glass rovings as possible without breakage or fraying thereof. This is accomplished by the apparatus of Fig. 6 by means responsive to a curing characteristic of the resin, such as, for example, a thermocouple 62 which is placed on the resin surface and produces an electrical current proportional to the temperature change of the resin during the curing cycle. The potentiometer 63 may be adjusted such that at a predetermined voltage output of the thermocouple corresponding to the predetermined curing temperature of the resin, a relay coil 64 is energized thereby moving relay armature 60' to its upper position. This increases the voltage supplied to motor 46. Motor 46 then drives, as before, to apply an additional tension to the rovings 27 as determined by the predetermined magnitude of the voltage supplied thereto. Again when the second tension of the rovings is reached the motor will stall and hold such tension. The resin may now be allowed completely to cure, that is, completely converted to its solid, infusible state, and the final steps of the process carreid out, i. e., removing the cured structure from the mold, trimming the structure, etc. Thus in Fig. 6, automatic means are provided for applying controlled tensions to the rovings. It has not as yet been determined whether the second tensioning serves to compensate for the thermal expansion of the glass fibers or whether the glass-resin combination increases in strength at the above point in the resin exotherm, or both, but I find the modulus of elasticity and the strength-to-weight ratio of the finished structure is considerably increased if the second tensioning is employed.

It will be understood that instead of increasing the tension on the rovings to the second predetermined tension by means of a relay operated switch, I may slowly increase the tension as the temperature of the curing resin increases. This can be accomplished by means of a proportional relay controlled by the increasing output of the thermocouple 62 in which the armature slowly decreases the shunt resistance 56 across the power source 58 to thereby progressively increase the voltage supplied to motor 46. In this case amplification of the thermocouple output may be required.

The modification illustrated in Fig. 8 discloses other structural forms which may be constructed in accordance with the teachings of the present invention. This modification illustrates apparatus which may be employed in making long hollow tubing which may be used for many applications requiring high strength-to-weight ratios, such as, for example, a boat spar or mast, or any other hollow tubing and the like. As shown, a rigid, sturdy frame or jig 70 is provided which may be turned up at its ends as at 71 to provide two fixed spaced arms 72. Journaled in the arms 72 by means of thrust bearings 73 are shafts 74 and 75, each shaft carrying at its inner end cylindrical members 76 and 77 which may be formed of wood or other suitable rigid material. Arranged on the outer surface of the cylinders 76 and 77 are a plurality of hooks 78 as shown in Fig. 9.

Between the members 76 and 77 are formed a plurality of rovings 90 of glass fiber which may be preimpregnated with a thermosetting resin, such as a polyester resin. These rovings are secured to the hooks 78, the hooks being so spaced and located on the members 76 and 77 that when all of the rovings are in place the rovings define a long cylinder between the jig arms 72. In accordance with an object of my invention, I have provided means for imparting tension to each of the rovings. As shown in Fig. 8, shaft 74 has at its outer end a cylindrical rack 80 which is meshed with a pinion 81 journaled in a bracket 82 which is rigid with arm 71. After the impregnated rovings are in place on members 76 and 77, pinion 81 is rotated, as by suitable rotating means, such as by handle or crank 83. Such rotation of pinion 81 translates rack 80 and member 76 applying tension to the rovings. A suitable pawl and ratchet mechanism 84 is provided for maintaining the tension on the rovings. As above, tension is maintained on the rovings during curing. Also, during the curing process, and in accordance with a curing characteristic of the resin, a second predetermined tensional load may be applied to the rovings as in the modification illustrated in Fig. 6. After tension has been applied to the rovings, and before the resin is allowed to cure, I insert a plurality of thin, circular wafers or discs 86, preferably fashioned from stiff sheets of cured resin impregnated glass fabric along the entire length of the tubing and spaced approximately a foot apart. These discs are preferable in applications of the finished tubing requiring bending or curving thereof, since they not only will prevent the tubing from crushing but will also insure an even, uniform curve. Since the discs, which in reality are like bulkheads, are inserted before the resin is cured, they will be integrally bonded with the rovings after curing.

After the resin is cured the resulting cylindrical frame-like structure is wrapped with glass rovings as at 87. This is easily accomplished by securing one end of a continuous roving 88 to one end of the structure and then rotating the entire structure in the bearings 73 as by means of a suitable drive mechanism, such as by crank 89. While the frame-like structure is rotated the roving is laid in place thereon in a tight spiral, the convolutions thereof preferably touching each other. It is preferable that the rovings 88 be preimpregnated with resin although the resin may be applied after the winding of the roving is completed.

The resulting cylindrical structure is now covered with an overlapping spiral of cellophane ribbon 92 which is applied in a manner similar to that employed for winding on the roving 88. This ribbon 92 is preferably applied before the resin impregnating roving 88 is cured so that upon curing thereof the ribbon is bonded with the roving 88 resulting in an extremely strong, yet light weight, tubular structure.

After the entire structure is completed on the jig 70 and the resin allowed thoroughly to cure, it may be removed from the jig by cutting the longitudinal rovings adjacent the members 76 and 77.

The resulting tubing is extremely strong, the strength deriving from longitudinal rovings which act as continuous reinforcing rods extending over the entire length of the tubing, the wafers 86 serving to maintain the circular cross-section. As set forth above, the modulus of elasticity is also greatly increased as in the strength-to-weight ratio.

The term "cure" or "curing" as used in the foregoing specification is intended to denote the conversion of the thermosetting resin from its liquid, fusible state to its solid, infusible state.

Since many changes could be made in the above described construction and many apparently widely different embodiments of this invention could be made without departure from the scope thereof, it is intended that all matter contained in the above description or shown in the accompanying drawings shall be interpreted as illustrative and not in a limiting sense.

I claim:

1. Apparatus for producing substantially rigid glass-reinforced plastic structures comprising a jig having a mold mounted thereon conforming to the desired shape of the completed structure, an element movably mounted on said jig and having fastening means carried thereby for individually securing the ends of a plurality of glass fiber rovings, said fastening means being so located on said jig and relative to said mold that said rovings pass over the surface of said mold from one side to the other thereof and said rovings being impregnated with a thermosetting resin in its fluid state, said resin exhibiting a temperature rise during the conversion thereof from its liquid to its infusble state, means including driving means for displacing said element relative to said mold in a direction and to an amount such as to impart to each of said rovings a first predetermined tensional load, and means responsive to substantially the maximum temperature rise of said resin during said conversion for additionally controlling said driving means to thereby displace said element in said direction and to an amount such as to impart to each of said rovings a second predetermined tensional load.

2. Apparatus for producing glass-reinforced plastic structures comprising a mold having a shape conforming to the shape of the completed structure, a frame movable relative to said mold, means coupled with said frame to which a plurality of glass fiber rovings are fastened, said frame being so located relative to said mold that said rovings conform to the shape of the completed structure, and said rovings being impregnated with a thermosetting resin in its liquid state characterised by a rise in temperature during the conversion thereof to its solid, infusible state, means for moving said frame relative to said mold whereby to apply a first tensional load substantially equal to the elastic limit of said impregnated rovings, and means responsive to substantially the maximum temperature rise of said resin for controlling said last-mentioned means such that said frame is farther moved relative to said mold whereby to apply a second tensional load to said heated rovings.

3. Apparatus for producing substantially rigid glass-reinforced plastic structures comprising a jig including a mold mounted thereon conforming to the desired shape of the completed structure, means carried by said jig for individually securely holding the ends of a plurality of glass fiber rovings, said holding means being so located on said jig and relative to said mold that said rovings pass over the surface of the mold from one side to the other thereof and said rovings being impregnated with a thermosetting resin in its liquid state, elastic means coupled at one end with said holding means and at the other end with said jig, means for supporting said elastic means in a stretched condition while said rovings are fastened to said holding means, and means for releasing said holding means whereby said elastic means imparts to and maintains on each of said rovings a predetermined tensional load during the conversion of said resin to its solid, infusible state.

4. Apparatus for producing substantially rigid glass-reinforced plastic structures comprising a jig including a mold mounted thereon conforming to the desired shape of the completed structure, a frame movably mounted on said jig, means carried by said frame for holding at least one end of a plurality of glass fiber rovings, said means being so located on said jig and relative to said mold that said rovings pass over the surface of said mold from one side to the other thereof and said rovings being impregnated with a thermosetting resin in its fluid state, means including driving means for displacing said frame relative to said mold in a direction and to an amount such as to impart to each of said rovings a predetermined tensional load whereby said rovings are maintained under said load during the converting of said resin to its solid, infusible state.

References Cited in the file of this patent

UNITED STATES PATENTS

| | | |
|---|---|---|
| 1,232,110 | Sloper | July 3, 1917 |
| 1,605,356 | Leipert | Nov. 2, 1926 |
| 2,417,586 | Crosley | Mar. 18, 1947 |
| 2,594,693 | Smith | Apr. 29, 1952 |
| 2,614,054 | Baisch et al. | Oct. 14, 1952 |
| 2,614,058 | Francis | Oct. 14, 1952 |